(12) United States Patent
Bruno et al.

(10) Patent No.: US 10,384,785 B2
(45) Date of Patent: Aug. 20, 2019

(54) TWO MODE SYSTEM THAT PROVIDES BLEED AND OUTSIDE AIR OR JUST OUTSIDE AIR

(71) Applicant: Hamilton Sundstrand Corporation, Windsor Locks, CT (US)

(72) Inventors: Louis J. Bruno, Ellington, CT (US); Diane G. Drew, Venice, FL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 0 days.

(21) Appl. No.: 15/435,782

(22) Filed: Feb. 17, 2017

(65) Prior Publication Data

US 2018/0237144 A1    Aug. 23, 2018

(51) Int. Cl.
| | |
|---|---|
| *B64D 13/08* | (2006.01) |
| *B64D 13/04* | (2006.01) |
| *B64D 13/06* | (2006.01) |

(52) U.S. Cl.
CPC ............ *B64D 13/08* (2013.01); *B64D 13/04* (2013.01); *B64D 13/06* (2013.01); *B64D 2013/0603* (2013.01); *B64D 2013/064* (2013.01); *B64D 2013/0618* (2013.01); *B64D 2013/0648* (2013.01); *B64D 2013/0688* (2013.01); *Y02T 50/56* (2013.01)

(58) Field of Classification Search
CPC . F25B 9/06; F25B 11/02; F25B 9/004; B64D 13/08; B64D 13/00; B64D 13/06; B64D 2013/0618; B64D 2013/0644; B64D 2013/0674; B64D 2013/0648

USPC .......................................................... 62/95
See application file for complete search history.

(56) References Cited

U.S. PATENT DOCUMENTS

| | | | |
|---|---|---|---|
| 4,419,926 A | | 12/1983 | Cronin et al. |
| 5,299,763 A | * | 4/1994 | Bescoby ............... B64D 13/06 244/118.5 |
| 5,461,882 A | * | 10/1995 | Zywiak ............. B60H 1/00007 62/401 |
| 7,467,524 B2 | | 12/2008 | Brutscher et al. |
| 7,845,188 B2 | | 12/2010 | Brutscher et al. |
| 7,849,702 B2 | | 12/2010 | Parikh |
| 8,272,930 B2 | | 9/2012 | Klimpel et al. |
| 8,973,867 B2 | | 3/2015 | Eichholz et al. |
| 9,169,024 B2 | | 10/2015 | Voinov |

(Continued)

FOREIGN PATENT DOCUMENTS

| | | |
|---|---|---|
| EP | 1129941 A2 | 9/2001 |
| EP | 2735510 A1 | 5/2014 |

(Continued)

OTHER PUBLICATIONS

Search Report dated Apr. 26, 2018 in U310882EP, EP Application No. EP18156563, 10 pages.

*Primary Examiner* — Frantz F Jules
*Assistant Examiner* — Steve S Tanenbaum
(74) *Attorney, Agent, or Firm* — Cantor Colburn LLP

(57) ABSTRACT

An aircraft is provided. The aircraft includes a pressurized volume and an air conditioning system. The air conditioning system operates in a first mode or a second mode. The first mode includes when a first medium and a second medium and are mixed and provided to the pressurized volume. The second mode includes when only the first medium is provided to the pressurized volume.

2 Claims, 6 Drawing Sheets

(56) References Cited

U.S. PATENT DOCUMENTS

| | | | |
|---|---|---|---|
| 9,481,468 B1 | 11/2016 | Schiff | |
| 9,487,300 B2 | 11/2016 | Klimpel et al. | |
| 2001/0004837 A1* | 6/2001 | Sauterleute | B64D 13/06 62/402 |
| 2014/0124160 A1 | 5/2014 | Houssaye et al. | |
| 2016/0075435 A1 | 3/2016 | Stieger et al. | |
| 2016/0083100 A1 | 3/2016 | Bammann et al. | |
| 2016/0146114 A1 | 5/2016 | Bruno | |
| 2016/0207606 A1 | 7/2016 | Hara et al. | |
| 2016/0214722 A1 | 7/2016 | McAuliffe et al. | |
| 2016/0214723 A1 | 7/2016 | Fox et al. | |
| 2016/0229541 A1 | 8/2016 | Bruno et al. | |
| 2016/0340048 A1 | 11/2016 | Squier | |

FOREIGN PATENT DOCUMENTS

| | | | |
|---|---|---|---|
| EP | 2998223 A1 | 3/2016 | |
| WO | 2016189421 A1 | 12/2016 | |

\* cited by examiner

TWO MODE SYSTEM THAT PROVIDES BLEED AND OUTSIDE AIR OR JUST OUTSIDE AIR

BACKGROUND

In general, a contemporary air condition system of an aircraft utilizes bleed air from an engine to manage cabin environmental conditions. Yet, the use of bleed air risks contaminants entering the cabin, such as oil leaked by the engine. Thus, there is a need for reducing or eliminating the contaminants from the cabin.

BRIEF DESCRIPTION

According to one or more embodiments, an aircraft is provided. The aircraft includes a pressurized volume and an air conditioning system. The air conditioning system operates in a first mode or a second mode. The first mode includes when a first medium and a second medium and are mixed and provided to the pressurized volume. The second mode includes when only the first medium is provided to the pressurized volume.

According to one or more embodiments, the air conditioning system can be configured to divert a flow of the second medium downstream of a heat exchanger to enter a turbine of the air conditioning system.

According to one or more embodiments, the air conditioning system can be configured to divert a flow of the first medium upstream of a heat exchanger to enter a turbine of the air conditioning system.

According to one or more embodiments, the air conditioning system can be configured to divert a flow of the second medium upstream of a heat exchanger to downstream of a turbine of the air conditioning system.

According to one or more embodiments, the air conditioning system can be configured to provide a flow of the second medium to a turbine of the air conditioning system.

According to one or more embodiments, the first medium can comprise fresh air.

According to one or more embodiments, the second medium can comprise bleed air.

According to one or more embodiments, the air conditioning system can comprise a second turbine configured to receive a third medium.

According to one or more embodiments, the third medium can comprise cabin discharge air.

According to one or more embodiments, the air conditioning system can comprise a compressor configured to compress the first medium in a single stage configuration.

BRIEF DESCRIPTION OF THE DRAWINGS

The subject matter is particularly pointed out and distinctly claimed in the claims at the conclusion of the specification. The forgoing and other features, and advantages thereof are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the FIGS.

Embodiments herein provide an environmental control system of an aircraft that mixes mediums from different sources and uses the different energy sources to power the environmental control system and to provide cabin pressurization and cooling at a high fuel burn efficiency. The medium can generally be air, while other examples include gases, liquids, fluidized solids, or slurries.

Figure 1:
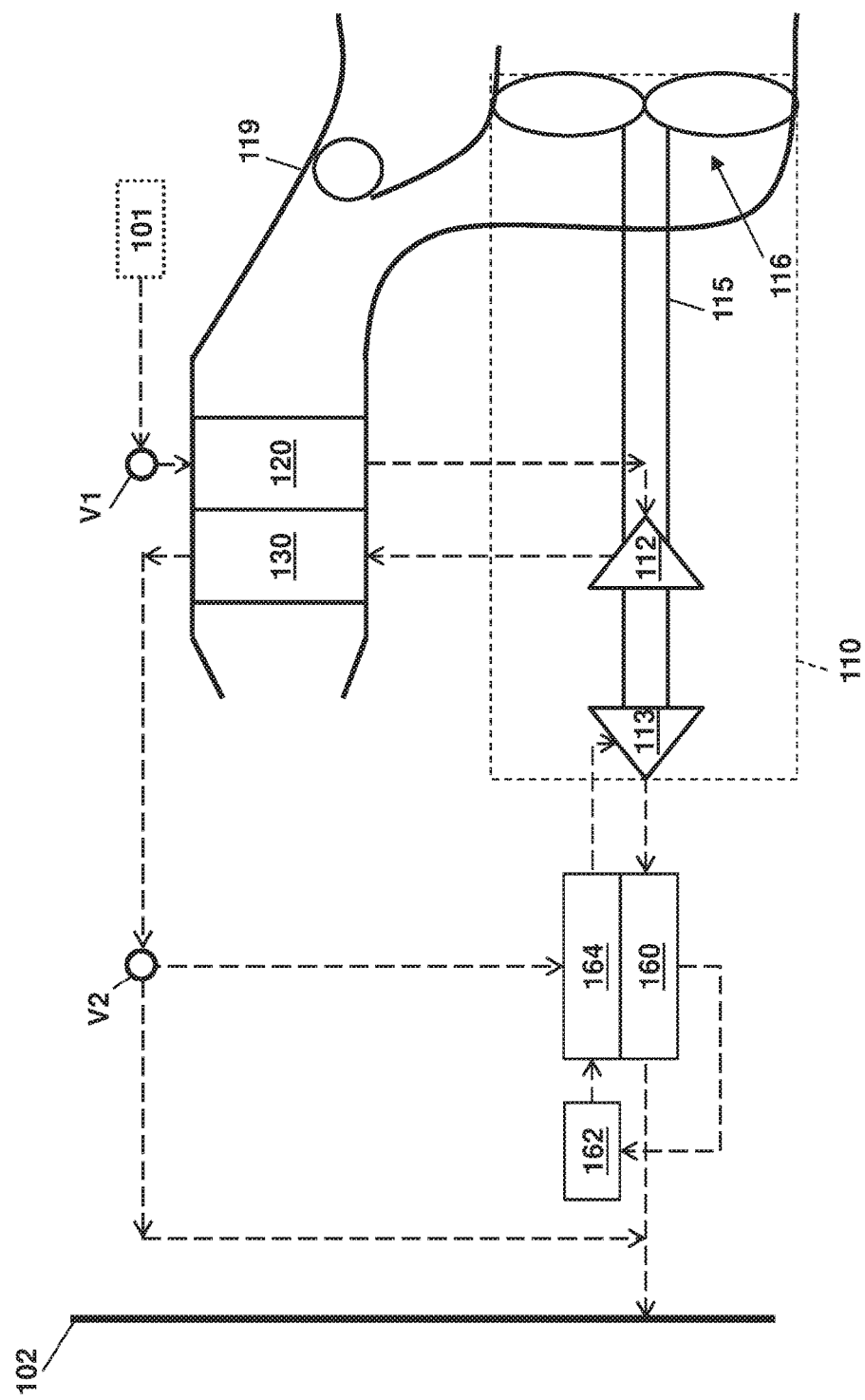
FIG. 1 is a diagram of an schematic of an environmental control system according to one or more embodiments embodiment.

Turning to FIG. 1, a system 100 that receives a medium from an inlet 101 and provides a conditioned form of the medium to a chamber 102 is illustrated. The system 100 comprises a compressing device 110. As shown, the compressing device 110 comprises a compressor 112, a turbine 113, a shaft 115, and a fan 116. The system 100 also comprises a primary heat exchanger 120, a secondary heat exchanger 130, a condenser 160, a water extractor 162, and a reheater 164.

The compressing device 110 is a mechanical device that includes components for performing thermodynamic work on the medium (e.g., extracts work from or works on the medium by raising and/or lowering pressure and by raising and/or lowering temperature). Examples of the compressing device 110 include an air cycle machine, a three-wheel air cycle machine, a four-wheel air cycle machine, etc.

The compressor 112 is a mechanical device that raises the pressure of the medium received from the inlet 101. Examples of compressor types include centrifugal, diagonal or mixed-flow, axial-flow, reciprocating, ionic liquid piston, rotary screw, rotary vane, scroll, diaphragm, air bubble, etc. Further, compressors can be driven by a motor or the medium via the turbine 113.

The turbine 113 is mechanical device that drives the compressor 112 and the fan 116 via the shaft 115. The fan 116 (e.g., a ram air fan) is a mechanical device that can force via push or pull methods air through the shell 119 across the heat exchangers 120 and 130 at a variable cooling to control temperatures. The shell 119 receives and directs a medium (such as ram air) through the system 100. In general, ram air is outside air used as a heat sink by the system 100.

The heat exchangers 120 and 130 are devices built for efficient heat transfer from one medium to another. Examples of heat exchangers include double pipe, shell and tube, plate, plate and shell, adiabatic wheel, plate fin, pillow plate, and fluid heat exchangers.

The condenser 160 and the reheater 164 are particular types of heat exchangers. The water extractor 162 is a mechanical device that performs a process of taking water from the medium. Together, the condenser 160, the water extractor 162, and/or the reheater 164 can combine to be a high pressure water separator.

The elements of the system 100 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system 100. Valves can be operated by actuators, such that flow rates of the medium in any portion of the system 100 can be regulated to a desired value.

As shown in FIG. 1, the medium can flow from an inlet 101 through the system 100 to a chamber 102, as indicated by dashed-lined arrows. A vale V1 (e.g., a mass flow control valve) controls the flow of the medium from the inlet 101 to the system 100. Further, a vale V2 controls whether the flow of the medium from the secondary heat exchanger 130 bypasses the turbine 113 in accordance with a mode of the system 100. A combination of components of the system 100 can be referred to as an air conditioning pack or a pack. The pack can begin at a vale V1 and conclude as air exits the condenser 160.

The system 100 will now be described in view of the above aircraft embodiment. In the aircraft embodiment, the medium can be air and the system 100 can be an environmental control system. The air supplied to the environmental control system at the inlet 101 can be said to be "bled" from a turbine engine or an auxiliary power unit. When the air is being provided by the turbine engine or the auxiliary power unit connected to the environmental control system, such as from the inlet 101, the air can be referred to as bleed air (e.g., pressurized air that comes from an engine or an auxiliary power unit). The temperature, humidity, and pressure of the bleed air vary widely depending upon a compressor stage and a revolutions per minute of the turbine engine. Further, the bleed air inherently includes contaminant risk from the turbine engine or the auxiliary power unit.

Figure 2:
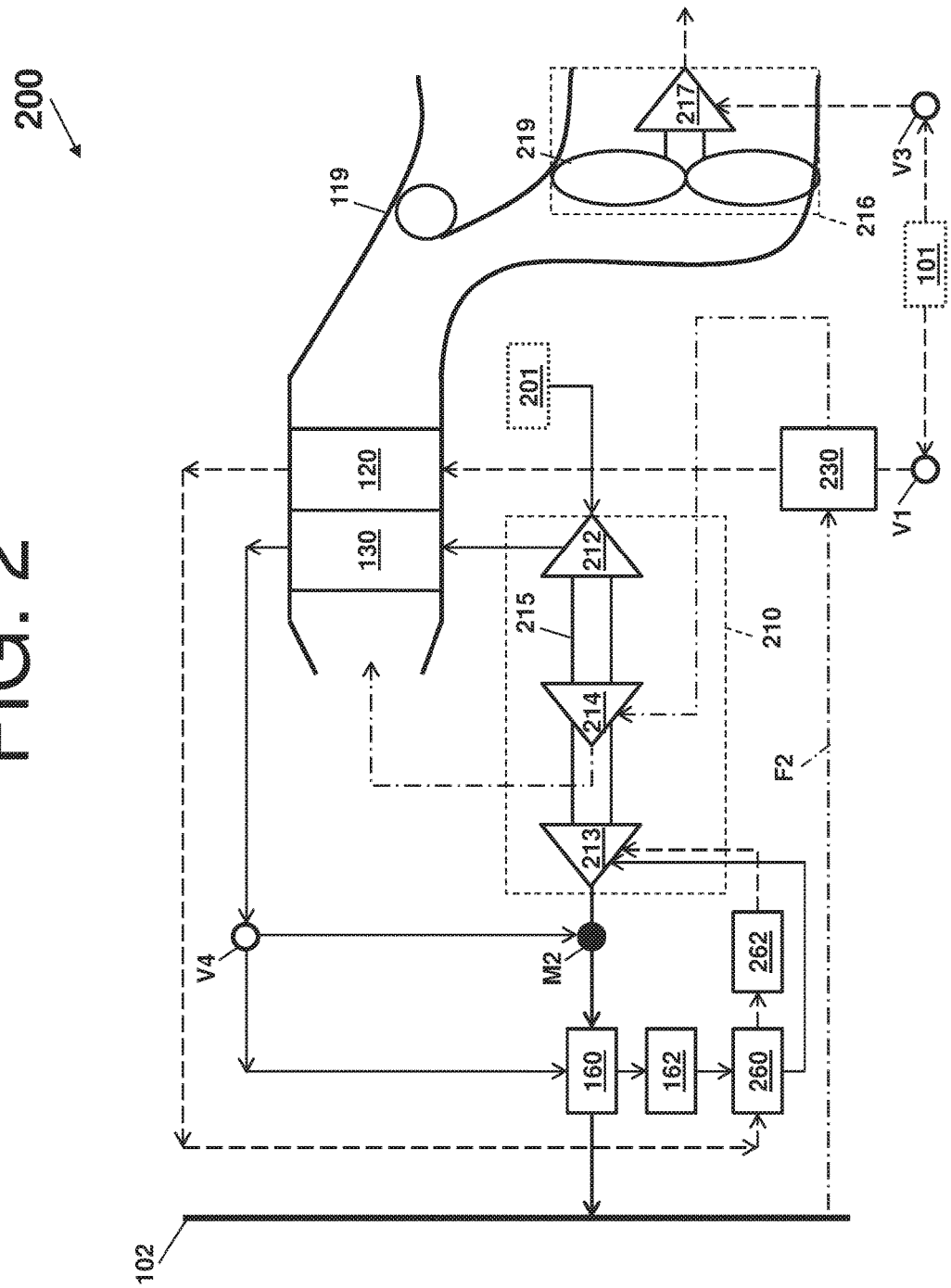
FIG. 2 is operation example of an environmental control system that mixes fresh air with bleed air according to one or more embodiments embodiment.

Turning now to FIG. 2, a schematic of an environmental control system 200 (e.g., an embodiment of system 100), as it could be installed on an aircraft, where in operation the environmental control system 200 mixes fresh outside air with bleed air, is depicted according to an embodiment. Components of the system 100 that are similar to the environmental control system 200 have been reused for ease of explanation, by using the same identifiers, and are not re-introduced.

Alternative components of the environmental control system 200 include an inlet 201 and a compressing device 210 (that comprises a compressor 212, a turbine 213, a turbine 214, and a shaft 215). The turbine 213 can be a duel entry turbine and include a plurality of inlet gas flow paths, such as an inner flow path and an outer flow path, to enable mixing of alternative medium flows at an exit of the turbine 213. The inner flow path can be a first diameter, and the outer flow path can be a second diameter Alternative components of the environmental control system 200 also include a rotating device 216 (e.g., turbine driven fan), which comprises a turbine 217 and a fan 219, along with a secondary path for the medium sourced from the inlet 101 (e.g., a valve V3 can provide the medium from the inlet 101 to an inlet of the turbine 217). Alternative components of the environmental control system 200 also include an outflow valve heat exchanger 230, a condenser/reheater 260, and a water extractor 262, along with a path for a medium denoted by the dot-dashed line F2 (e.g., the medium can be provided/sourced from the chamber 102 into the environmental control system 200).

In view of the above aircraft embodiment, when the medium is being provided from the chamber 102 (e.g., the medium leaving a pressurized volume, cabin of the aircraft, or cabin and flight deck of the aircraft), the medium can be referred as chamber discharge air (also known as pressured air or cabin discharge air). Note that in one or more embodiments, an exhaust from the environmental control system 200 (e.g., exhaust from turbine 215) can be released to ambient air through the shell 119 or sent to an outlet (e.g., a cabin pressure control system).

Further, when a medium is being provided from the inlet 201, the medium can be referred to as fresh outside air (also known as fresh air or outside air destined to enter the pressurized volume or chamber 102). The fresh outside air can be procured by one or more scooping mechanisms, such as an impact scoop or a flush scoop. Thus, the inlet 201 can be considered a fresh air inlet.

In low altitude operation of the environmental control system 200, high-pressure high-temperature air from either the turbine engine or the auxiliary power unit via inlet 101, through the valve V1 and the outflow valve heat exchanger 230, enters the primary heat exchanger 120. The primary heat exchanger 120 cools the high-pressure high-temperature air to nearly ambient temperature to produce cool high-pressure air. This cool high-pressure air enters the condenser/reheater 260, where it is further cooled by the fresh outside air sourced from the compressor 212 of the compressing device 210. The condenser/reheater 260 also condenses moisture from the cold high-pressure air, while heating/reheating the fresh outside air sourced from the compressor 212 of the compressing device 210. The cooling and condensing of the cold high-pressure air produces conditioned bleed air. Upon exiting the condenser/reheater 260, the conditioned bleed air enters the water extractor 262 (where additional moisture is removed) and enters the turbine 213 through a nozzle. The conditioned bleed air is expanded across the turbine 213 and work extracted from the conditioned bleed air. This extracted work drives the compressor 212 used to compress the fresh outside air.

Regarding the fresh outside air, the inlet 201 provides it to the compressor 212. The compressor 212 compresses the fresh outside air (in a single stage configuration). The act of compressing the fresh outside air, heats the fresh outside air to produce hot fresh air. The hot fresh air enters and exits the secondary heat exchanger 130 before entering the condenser 160. The fresh outside air is cooled by a mixture of compressed air and fresh outside air leaving the turbine. The fresh outside air next enter the water extractor 162 where any free moisture is removed, to cold dry fresh air. The cold dry air is reheated in the condenser/reheater to produce warm dry fresh air. This warm fresh air then enters the turbine 213 through a second nozzle, where it is expanded and work extracted.

The two air flows (e.g., the conditioned bleed air sourcing from inlet 101 and the warm fresh air sourcing from 201) are mixed at the turbine 213 to produce mixed air. This 'at the turbine' location can be considered a first mixing point of the environmental control system 200. The mixed air leaves the turbine and cools the fresh outside air leaving the secondary heat exchanger 130 in the condenser 160. The mixed air is then sent to condition the chamber 102.

In accordance with one or more embodiments, the condenser/reheater 260 can condense moisture in the bleed air, can reduce the moisture heat load in the air mixed air by 25%, and/or add energy to the cycle increasing a power of the compressor 212 by 5%. Note that the low altitude operation can be considered a low altitude mode. The low altitude mode can be used for ground and low altitude flight conditions, such as ground idle, taxi, take-off, and hold conditions.

In high altitude operation of the environmental control system 200, the fresh outside air can be mixed downstream of the turbine 213 (rather than at the turbine 213 or at the first mixing point). In this situation, cool medium pressure air (e.g., exiting the secondary heat exchanger 130) is directed by the valve V4 to downstream of the turbine 213. The location at which this cool medium pressure air mixes with the bleed air, which is sourced from the inlet 101 and exiting the turbine 213, can be considered a second mixing point M2 of the environmental control system 200. Note that, in the high altitude mode, the chamber discharge air exiting from the outflow valve heat exchanger 230 can then be sent to the turbine 214. The turbine 214 can utilize the energy of the chamber discharge air to provide a power assist for the operations of the compressor 212 (e.g., the turbine 214 is supplied hot air from the out flow heat exchanger 230, which is expanded and work is extracted). The compressor 212, thereby, can receive power from both the bleed air and the cabin discharge air. Note that in one or more embodiments, the outflow heat exchanger 230 can be omitted.

This high altitude operation can be considered a high altitude mode. The high altitude mode can be used at high altitude cruise, climb, and descent flight conditions. In the high altitude mode, fresh air aviation requirements for passengers are met by mixing the two air flows (e.g., the fresh outside air sourcing from 201 and the bleed air sourcing from inlet 101).

FIGS. 3, 4, 5, and 6 illustrate variations of the environmental control system 200. These variations FIGS. 3, 4, 5, and 6, each enable for a fresh air mode during high altitude operation to reduce/prevent contaminates from entering the chamber 102. The fresh air mode when a 100% fresh outside air is supplied to the chamber while the bleed air is cut off from the pressurized volume or used elsewhere by the environmental control system 200. The fresh air mode can be selectable by a cockpit of an aircraft or be automatic in response to a contaminant warning with respect to the bleed air.

Figure 3:
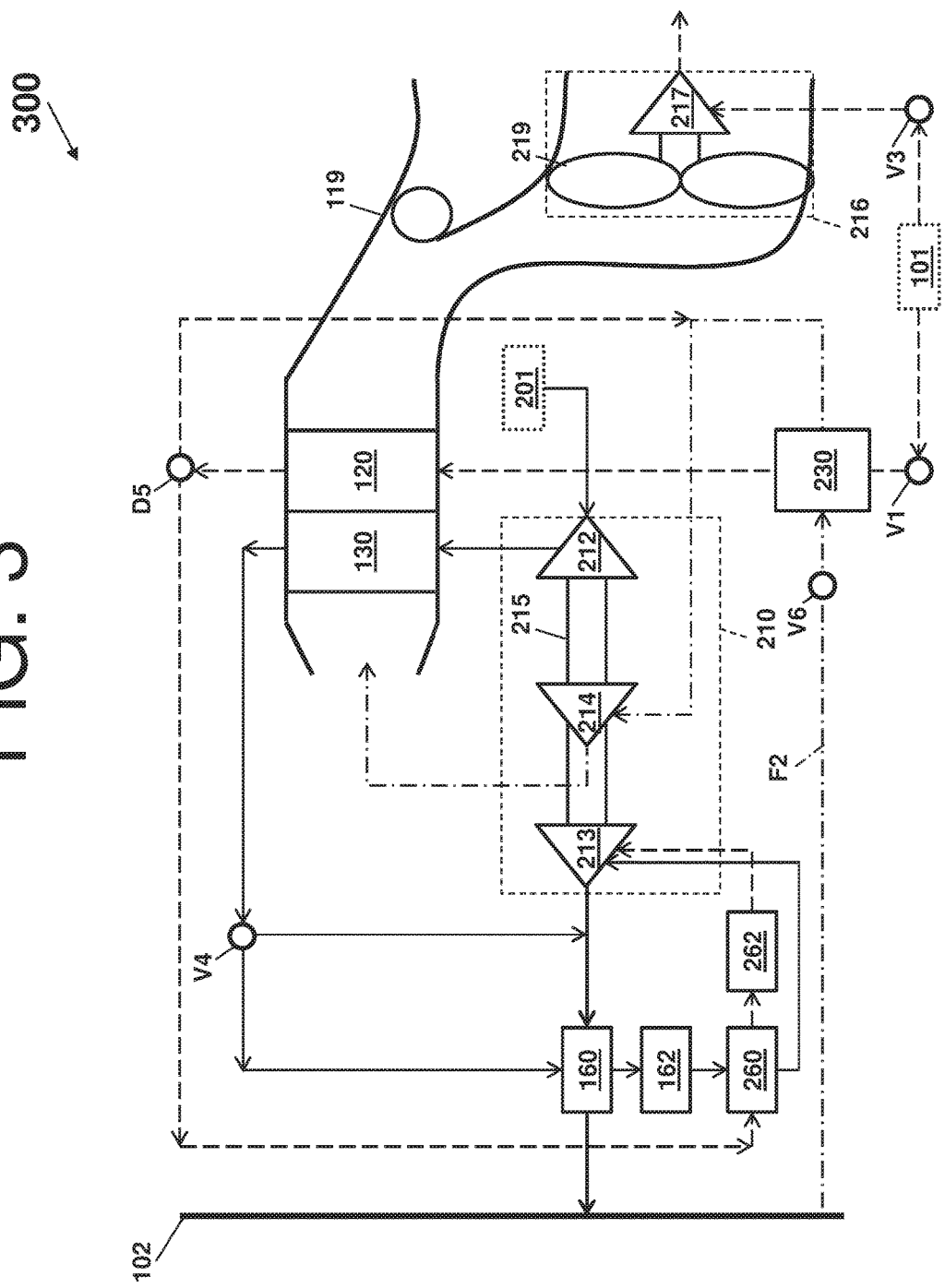
FIG. 3 is operation example of an environmental control system that mixes fresh air with bleed air according to one or more embodiments embodiment.

Turning now to FIG. 3, a schematic of an environmental control system 300 (e.g., an embodiment of the environmental control system 200) is depicted according to an embodiment. Components of the systems 100 and 200 that are similar to the environmental control system 300 have been reused for ease of explanation, by using the same identifiers, and are not re-introduced. Alternative components of the environmental control system 300 include a diversion point D5 that provides an additional path for the medium sourced from the inlet 101 (e.g., the diversion point D5 can divert contaminated bleed air from the inlet 101 to the turbine 214) and a valve V6 that provides an on/off control for the medium sourced from the chamber 102 (e.g., a valve V6 can shut off the chamber discharge air from the chamber 102). Further, the diversion point D5 can include one or more valves that close pathways, open pathways, and/or direct the medium to an alternative path.

The environmental control system 300 operates similarly to the environmental control system 200. The environmental control system 300 can additionally include a fresh air mode during the high altitude operation. For instance, the fresh air mode is used at cruise when it is desirable to put only fresh air (e.g., 100% of fresh outside air) and not the combination of fresh and bleed air into the chamber 102. When the fresh air mode is activated due to a detection of contaminated bleed air, only the fresh outside air sourced from inlet 201 compressed by the compressor 212 can enter the chamber 102. The fresh air is compressed in the compressor 212 and then cooled by the secondary heat exchanger 130 to produce cooled fresh air. The cooled fresh air then bypasses the turbine 213 and enters the chamber 102.

Further, the contaminated bleed air sourcing form 101 going through the primary heat exchanger 120 can be diverted to the turbine 214 at the diversion point D5. For instance, a valve with respect to the diversion point D5 (e.g., a cabin bleed air shut off valve) closes to prevent the contaminated bleed air from entering the chamber 102. Also, by diverting the contaminated bleed air to the turbine 214, the turbine 214 can be considered dual use, in that it is configured to receive flows of different mediums in the alternative. The contaminated bleed air goes into the turbine 214 for expansion and work extracting. Extracting work from the contaminated bleed air reduces a temperature of the contaminated bleed air to produce cool bleed air. The cold bleed air can then be dumped into a ram air exchanger inlet (e.g., in to the shell 119) and is used to cool the fresh air from the compressor 212 and the bleed air itself. In turn, an amount of ram air required by the environmental control system 300 is reduced.

In addition, since the turbine 214 receives the contaminated bleed air, the cabin discharge air is not used by the environmental control system 300. Thus, the cabin discharge air can be prevented from entering the turbine 214 by the valve V6 (e.g., a cabin air smart check valve). This valve V6 closes and prevents the flow of the cabin discharge air to the turbine 214.

Figure 4:
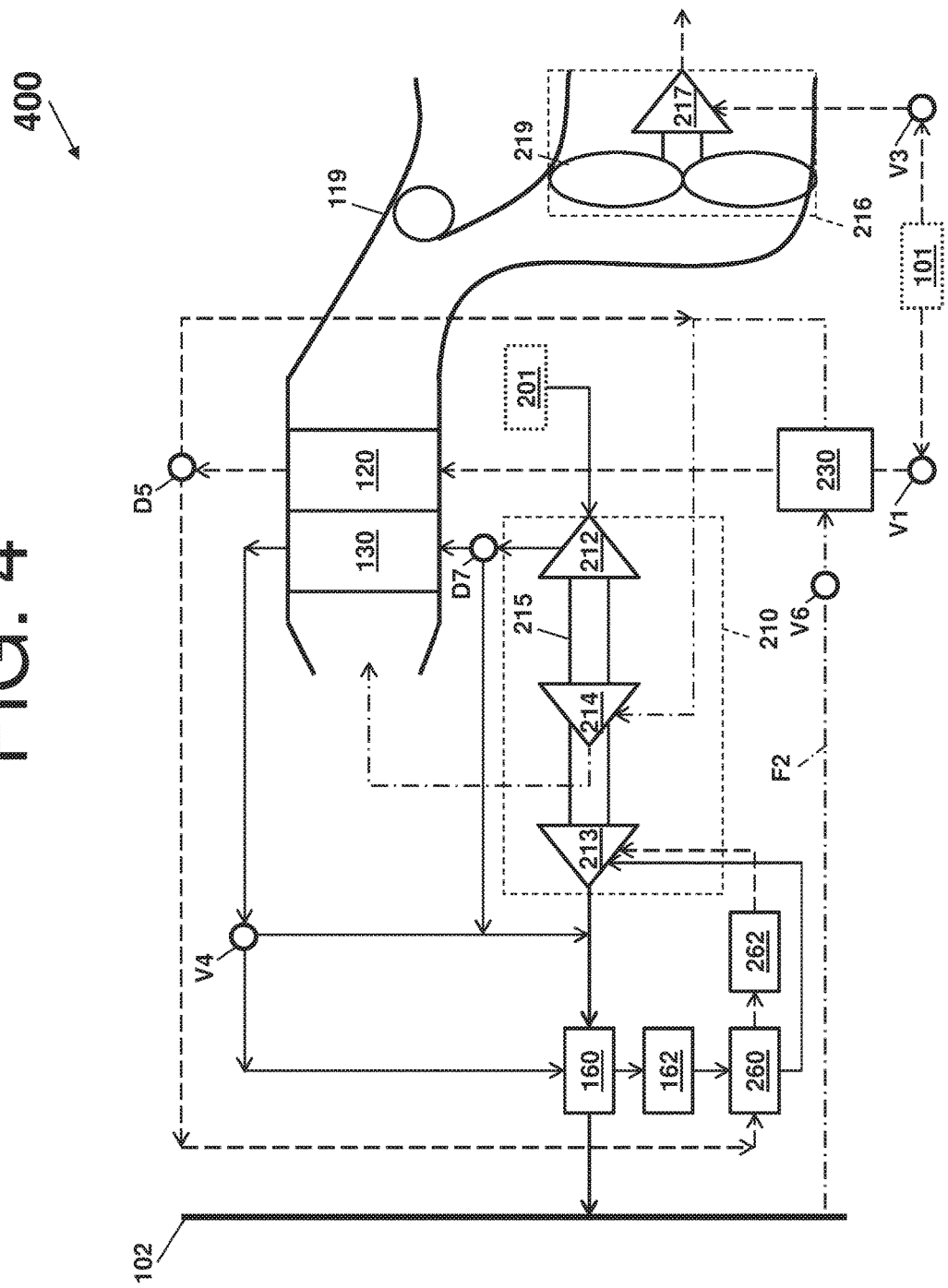
FIG. 4 is operation example of an environmental control system that mixes fresh air with bleed air according to one or more embodiments embodiment.

Turning now to FIG. 4, a schematic of an environmental control system 400 (e.g., an embodiment of the environmental control system 200) is depicted according to an embodiment. Components of the systems 100, 200, and 300 that are similar to the environmental control system 400 have been reused for ease of explanation, by using the same identifiers, and are not re-introduced. Alternative components of the environmental control system 300 include a diversion point D7 that provides an additional path for the medium sourced from the inlet 201 (e.g., a valve associated with the diversion point D7 can divert the fresh outside air from the inlet 201 to bypass the secondary heat exchanger 130).

Figure 5:
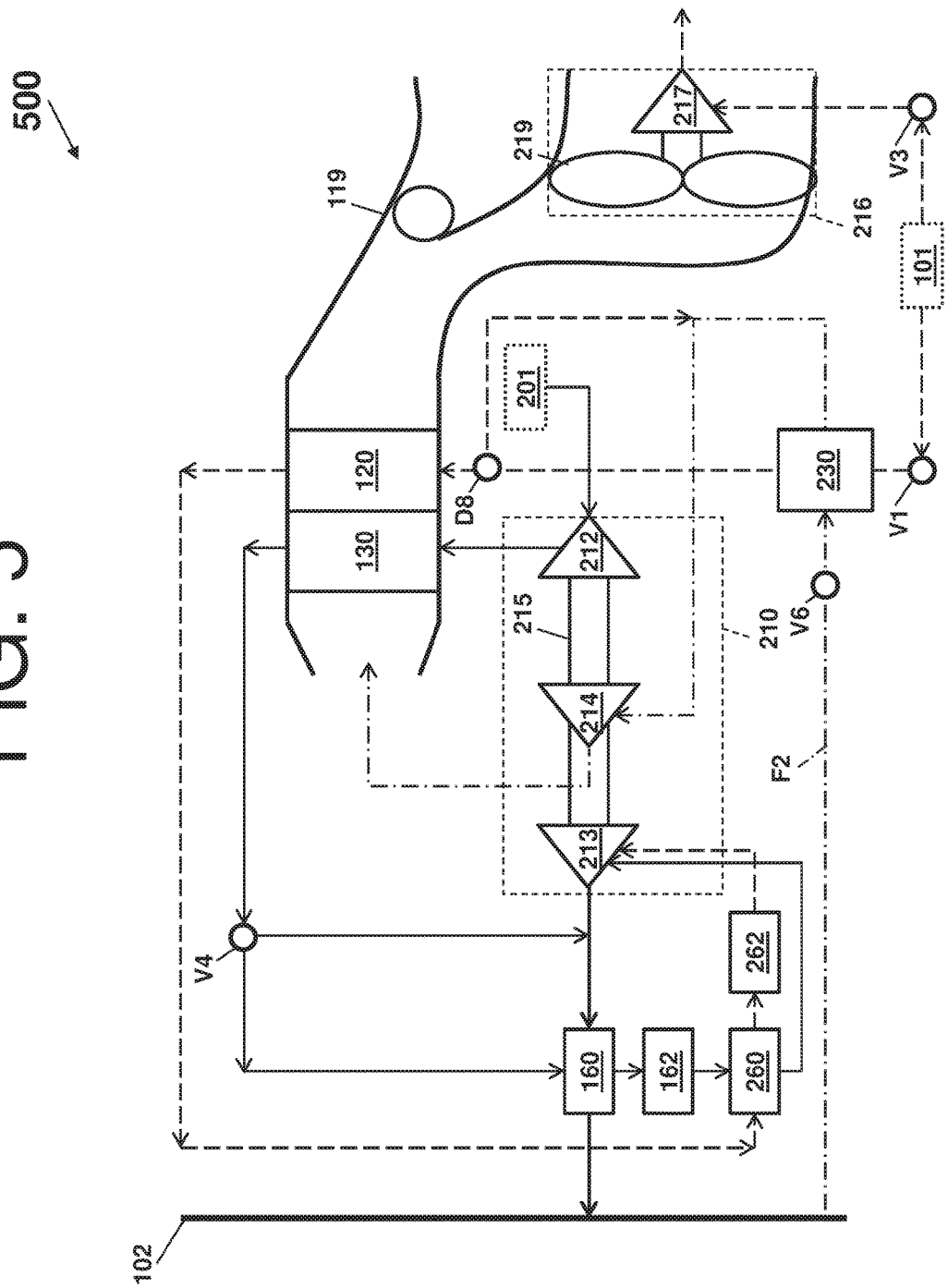
FIG. 5 is operation example of an environmental control system that mixes fresh air with bleed air according to one or more embodiments embodiment.

Turning now to FIG. 5, a schematic of an environmental control system 500 (e.g., an embodiment of the environmental control system 200) is depicted according to an embodiment. Components of the systems 100, 200, 300, and 400 that are similar to the environmental control system 500 have been reused for ease of explanation, by using the same identifiers, and are not re-introduced. Alternative components of the environmental control system 300 include a diversion point D* that provides an additional path for the medium sourced from the inlet 101 (e.g., the diversion point D8 can divert contaminated bleed air from the inlet 101 to the turbine 214). Note that the diversion point D8 of FIG. 5 is upstream of the primary heat exchanger 120, while the diversion point D5 of FIG. 3 is downstream of the primary heat exchanger 120.

Figure 6:
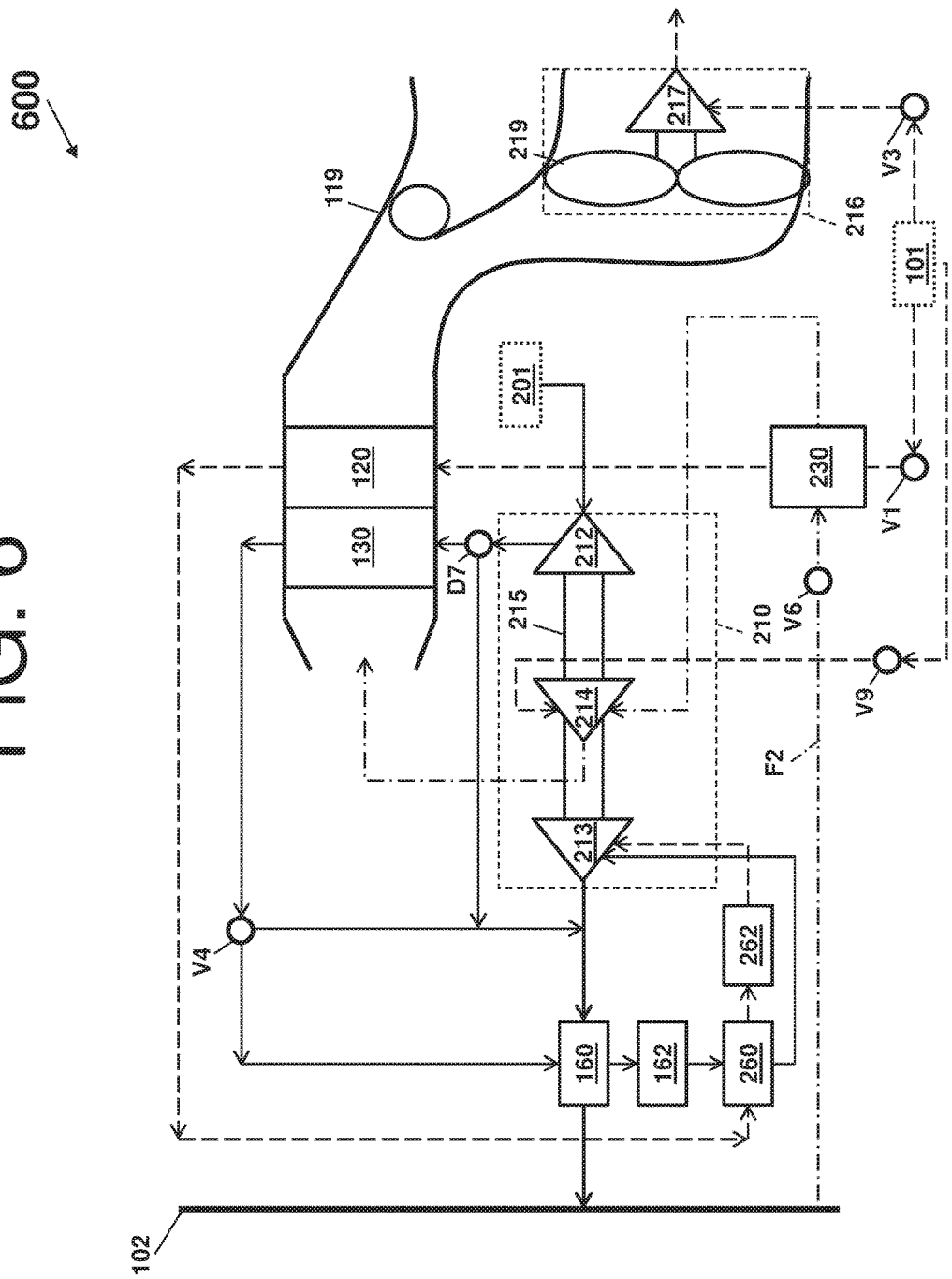
FIG. 6 is operation example of an environmental control system that mixes fresh air with bleed air according to one or more embodiment's embodiment.

Turning now to FIG. 6, a schematic of an environmental control system 600 (e.g., an embodiment of the environmental control system 200) is depicted according to an embodiment. Components of the systems 100, 200, 300, 400, and 500 that are similar to the environmental control system 600 have been reused for ease of explanation, by using the same identifiers, and are not re-introduced. Alternative components of the environmental control system 300 include a valve V9 that provides an additional path for the medium sourced from the inlet 101 (e.g., a valve V9 can divert the medium from the inlet 101 to enter the turbine 214).

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of embodiments herein. For instance, the steps may be performed in a differing order or steps may be added, deleted or modified. All of these variations are considered a part of the claims.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. An aircraft comprising:
a pressurized volume; and
an air conditioning system comprising first and second turbines and a diversion point, the air conditioning system configured to switch between operating in a first mode and a fresh air mode,
wherein the air conditioning system mixes and provides fresh air and bleed air to the pressurized volume when operating in the first mode, and
wherein, when operating in the fresh air mode, the first turbine of the air conditioning system receives the fresh air, the second turbine of the air conditioning system receives a cabin discharge air, and the air conditioning system only provides the fresh air to the pressurized volume, the air conditioning system activating the fresh air mode during high altitude operations of the aircraft, the air conditioning system utilizing the diversion point to divert a flow of the bleed air downstream of a heat exchanger of the aircraft to enter the second turbine.

2. The aircraft of claim 1, wherein the air conditioning system comprises a compressor configured to compress the fresh air in a single stage configuration.

\* \* \* \* \*